US00RE34321E

United States Patent [19]

Campbell

[11] E Patent Number: Re. 34,321

[45] Reissued Date of Patent: Jul. 20, 1993

[54] CENTRIFUGAL FLOTATION APPARATUS AND METHOD

[75] Inventor: Thomas P. Campbell, North Bend, Oreg.

[73] Assignee: Clean Earth Technologies, Inc., Grass Valley, Calif.

[21] Appl. No.: 776,083

[22] Filed: Oct. 11, 1991

Related U.S. Patent Documents

Reissue of:

[64] Patent No.: 4,874,357
Issued: Oct. 17, 1989
Appl. No.: 329,294
Filed: Mar. 27, 1989

[51] Int. Cl.[5] ..... B04B 11/00

[52] U.S. Cl. ..... 494/26; 494/37; 494/60

[58] Field of Search ..... 494/26, 27, 28, 29, 494/30, 37, 43, 50, 56, 57, 60, 65, 67; 210/781, 782, 360.1

[56] References Cited

U.S. PATENT DOCUMENTS

| | | | |
|---|---|---|---|
| 2,749,031 | 5/1956 | Hornbostel | 233/20 |
| 4,152,254 | 5/1979 | Steier | 209/148 |
| 4,186,096 | 1/1980 | Areaux | 210/377 |
| 4,247,391 | 1/1981 | Lloyd | 209/164 |
| 4,353,499 | 10/1982 | Simonds | 233/27 |

FOREIGN PATENT DOCUMENTS

| | | |
|---|---|---|
| 3634323 | 4/1988 | Fed. Rep. of Germany . |
| 539535 | 4/1922 | France . |
| 2539772 | 7/1984 | France . |

*Primary Examiner*—Robert W. Jenkins
*Attorney, Agent, or Firm*—Wells, St. John, Roberts, Gregory & Matkin

[57] ABSTRACT

The apparatus includes a powered bowl assembly having a tubular shaft journalled within a base of the apparatus. A pressurized air flow is discharged into slurry in the bowl assembly via a circular array of bubble generators. An impellor discharges the slurry outwardly against an upwardly inclined annular surface of the bowl assembly to cause the slurry to merge upwardly with the streams to promote flotation. Slurry within the bowl assembly forms a vortex with particle flotation forming a froth layer inwardly of a slurry vortex. The froth exits the bowl assembly upwardly past a barrier partially closing the bowl assembly. Heavier gangue particles exit via an outlet about the bowl assembly periphery. A collector shroud is partitioned to receive the froth and the heavier waste material. A modified form of the apparatus includes an independently powered bowl assembly and impellor.

24 Claims, 1 Drawing Sheet

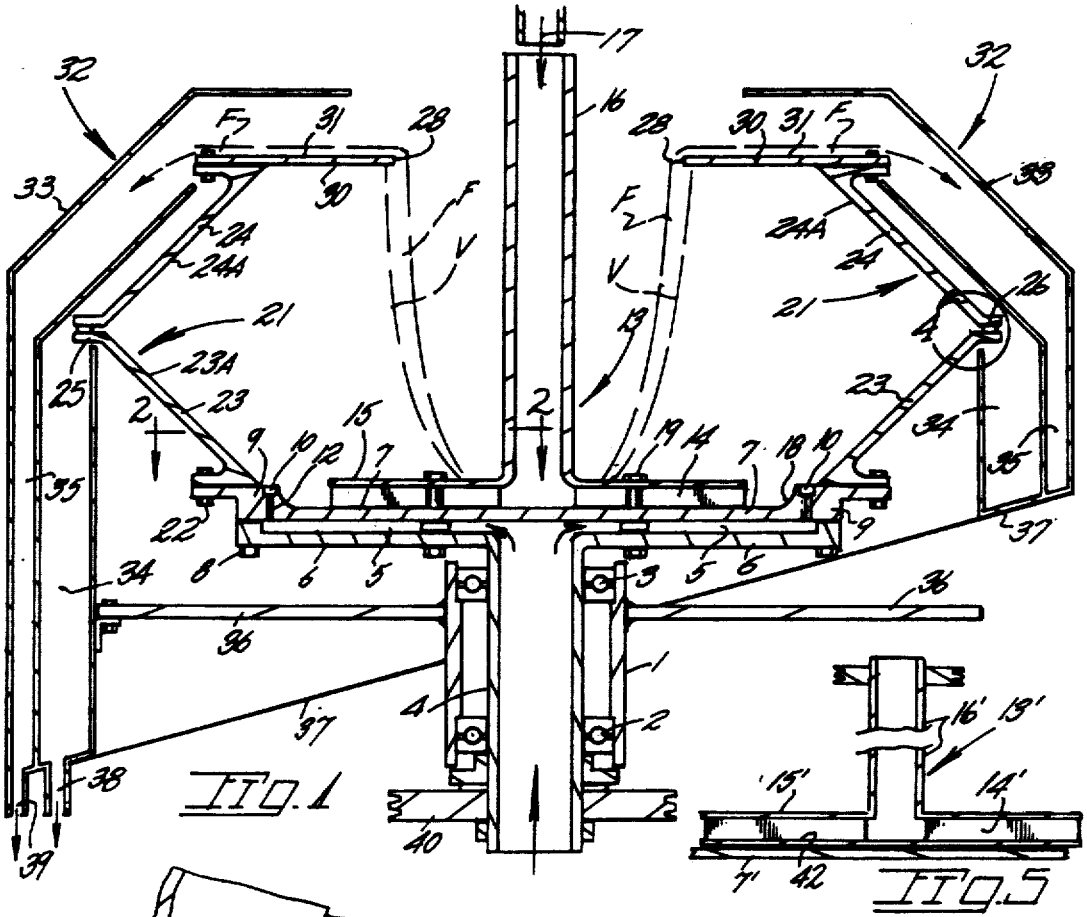
FIG. 1
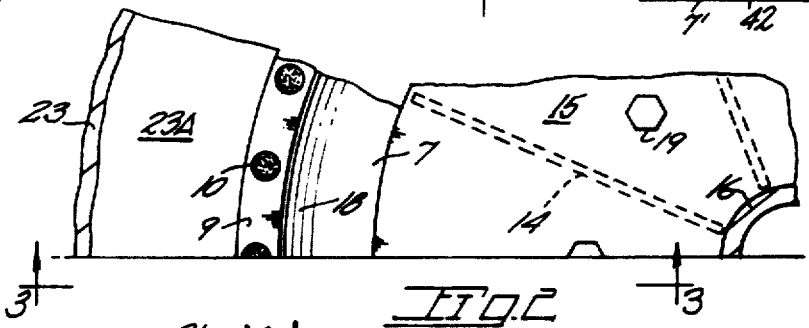
FIG. 2
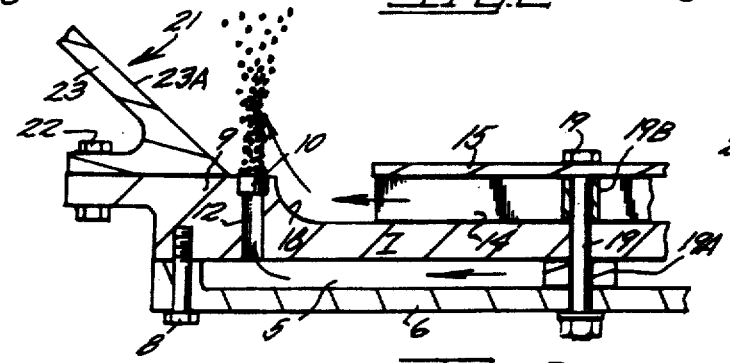
FIG. 3
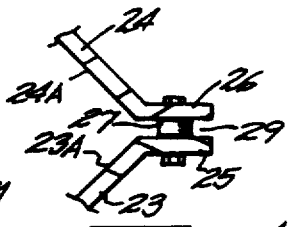
FIG. 4
FIG. 5

CENTRIFUGAL FLOTATION APPARATUS AND METHOD

Matter enclosed in heavy brackets [ ] appears in the original patent but forms no part of this reissue specification; matter printed in italics indicates the additions made by reissue.

BACKGROUND OF THE INVENTION

The present invention pertains generally to equipment or devices utilized for the separation of mineral or metallic particles by the flotation process.

The scarcity of high grade ore has placed greater emphasis on the recovering of small particles, termed fines, during processing. In certain instances in the past, such efforts were not economically justified. Presently tailings from past and present mineral processing operations are believed to be a valuable resource assuming such tailings can be economically processed.

In the prior art are flotation systems wherein a slurry flow is fed into the flotation unit above an injected airflow. Briefly, the mineral particles adhere to airflow bubbles and result in a concentrate forming at the flotation units upper surface. To the extent known, such systems rely entirely on the effect of differential gravity in such a flotation process. The flotation process is widely used for processing material containing fine particles which, in many instances, are not recovered.

Further background information is in Chapter 35 "Fine Particle Flotation" in Vol. 1 of a publication entitled Fine Particles Processing by P. Somasundaran and E & MJ Second Operating Handbook of Mineral Processing by L. White.

SUMMARY OF THE PRESENT INVENTION

The present invention is embodied in a machine for recovering fines from a slurry utilizing both flotation and centrifugal force.

The present machine subjects a slurry flow to centrifugal force with the flow forcefully directed toward bubble streams. Impellor means distributes the slurry flow for mergence with the streams of minute or fine size bubbles. Impellor discharge impinges against circular deflector means adjacent a ring bubble generator. Accordingly the slurry is subjected to a curtain of bubbles to initiate the flotation process. A first outlet of the bowl discharges a heavy material while a second outlet discharges a mineral enriched froth. The second opening of the bowl is located above and inwardly of the first opening. The outlets discharge into separate collectors. Provision is made to alter fluid flows to best suit the material being processed.

By subjecting the slurry made up of water and various mineral particles along with flotation reagents to centrifugal force and air bubbles, the froth so formed in the flotation cell is made heavier by a factor determined by the G loading resulting from the rotational speed of the cell i.e., the greater the RPM of the cell the greater the G load on cell contents.

Accordingly the particles in the slurry settle at a greater rate than the known flotation cells; bubble flow, opposite to G loading is at an increased rate due to the increased differential weight or mass between the slurry and the bubbles; and bubble size will be smaller due to the increased weight of the slurry.

Increased infusion of bubbles in the slurry greatly enhances bubble contact with small particles of mineral versus such contact in a typical flotation cell. Unwanted particles or gangue which would ordinarily be carried upward by a bubble stream into the enriched froth of a typical flotation cell are, in the present apparatus, drawn to a separate discharge due to their increased settling speed.

Important objectives include the provision of a centrifuge type flotation cell for the efficient treating of a slurry flow for the retrieval of fines heretofore, practically speaking, not retrievable; the provision of a flotation cell utilizing centrifugal force and bubble streams to act on a slurry flow to effect flotation at an accelerated rate to permit treating tailings for the recovery of fines as small as approximately 20 microns and less; the provision of a centrifugal flotation cell having readily altered or replaceable components to permit cell modification to best treat the material being processed; the provision of a flotation cell which achieves a high degree of air and particle mixing by the propagation of fine sized bubbles to enhance flotation.

BRIEF DESCRIPTION OF THE DRAWINGS

In the accompanying drawings:

FIG. 1 is a vertical section through the present apparatus;

FIG. 2 is a horizontal fragmentary view taken from along line 2—2 of FIG. 1;

FIG. 3 is an elevational view taken along line 3—3 of FIG. 2;

FIG. 4 is an enlarged detail view of that part of the apparatus encircled at 4 in FIG. 1; and FIG. 5 is a vertical sectional view of a modified impellor.

BRIEF DESCRIPTION OF THE PREFERRED EMBODIMENTS

With continuing attention to the drawings wherein applied reference numerals indicate parts similarly hereinafter identified, the reference numeral 1 indicates a portion of the base component of the present machine. Attendant base structure is not shown for the sake of clarity.

Base 1 serves as a bearing housing receiving suitable bearings at 2 and 3 in which is journalled a tubular air conduit shaft 4 with an air flow from a source of pressure being indicated by arrows.

A bowl assembly includes a plenum 5 served by conduit 4 and defined by a shaft mounted plate 6 and a closure 7 therefor of corresponding circular shape in plan view. A ring of fasteners at 8 join the plate and closure. Aerating or bubble generating means at 10 are circumferentially spaced in a recessed manner about an annular shoulder 9 of closure 7. The aerators may be of a porous ceramic nature each served by an air passageway 12 and suitably secured in place as by a bonding agent.

An impellor generally at 13 receives a slurry flow and includes vanes 14 interposed between a circular plate 15 and plenum closure 7. A slurry intake tube at 16 of the impellor receives a controlled slurry flow represented by an arrow 17. Impellor discharge impinges on an upwardly curved inclined surface at 18 outwardly adjacent impellor vanes 14. Inclined annular surface 18 imparts an upward component to the slurry discharged by the impellor for upward mergence and mixing of same with the several bubble streams issued by the aerators 10. To allow convenient impellor alteration, the fasteners at 19 removably secure the impellor in place to plenum closure 7. Spacer elements at 19A-19B isolate the fasteners from air and slurry flows.

With attention again to the bowl assembly, the same additionally includes wall structure generally at 21 carried by shoulder 9 of plenum closure 7 with a ring of fasteners at 22. The wall structure utilizes frusto conical members 23 and 24 which have outwardly convergent, conical wall surfaces at 23A-24A which converge toward a first outlet or discharge opening 29 (FIG. 4) defined by opposed annular wall flanges at 25 and 26. Spacers at 27 are replaceable with spacer sets of different height enabling the outlet size to be varied. A rim at 28 on an annular barrier plate 30 constitutes a barrier to aerated slurry in the bowl assembly. Particle laden froth at F will migrate past rim 28 and outwardly along plate surface 31 during operation of the apparatus.

Collector means generally at 32 are defined by a circular partitioned housing 33 with inner and outer chambers at 34 and 35 the former receiving the non-floating gangue material from first discharge outlet 29. A mounting plate at 36 supports collector 32 which, in turn, is supported by base 1. A collector bottom wall 37 is inclined to direct the collected material to outlets at 38 and 39.

Drive means for the bowl assembly includes a sheave 40 driven by a variable speed motor not shown. While a single drive is shown for both bowl assembly and the impellor means, it will be understood that the impellor means may be driven in a similar manner by a separate variable speed motor per FIG. 5 wherein the impellor 13' is separate from a closure plate 7' and provided with a plate 42 corresponding to plate 15'. Tube 16 of the impellor would be journalled in a manner similar to but independent of the bowl assembly.

In operation, froth formation at F occurs inwardly of the slurry vortex at V. Slurry entry via conduit 16 is regulated to avoid discharge of heavier materials with the froth. It will be appreciated that flow rates both of slurry and air as well as bowl assembly speed may vary to best suit the material being processed.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A centrifugal apparatus for separating by flotation mineral or metallic particles from a slurry, said apparatus comprising, a base, impellor means for dispersing the slurry about the impellor axis, a bowl assembly about said impellor means and into which the slurry is discharged by the impellor means, drive means for said bowl assembly, bubble generating means discharging streams of bubbles, conduit means in communication with a source of air to provide an air flow to bubble generating means, an inclined surface outwardly of the impellor means and against which slurry impinges prior to mergence with the bubble streams generated by the bubble generating means, a first bowl outlet, a second bowl outlet offset from said first outlet, and collector means disposed about said bowl assembly and defining chambers for the separate collection of material from the first and second outlets.

2. The apparatus claimed in claim 1 wherein said impellor means is coupled to and driven by said bowl assembly.

3. The apparatus claimed in claim 1 wherein said inclined surface is continuous.

4. The apparatus claimed in claim 3 wherein said inclined surface is of curved section.

5. The apparatus claimed in claim 1 wherein said bubble generating means include ceramic inserts inset in said bowl assembly outwardly adjacent said inclined surface.

6. The apparatus claimed in claim 5 wherein said inserts are in a circular array.

7. The apparatus claimed in claim 1 wherein said bowl assembly has outwardly convergent surfaces terminating at said first outlet.

8. The apparatus claimed in claim 7 wherein said bowl assembly has an annular barrier, said second outlet embodied in a barrier rim past which slurry froth moves.

9. The apparatus claimed in claim 7 wherein said outwardly convergent surfaces terminate in opposed flanges, spacers interposed between said flanges, means removably securing said spacers in place to permit spacer replacement to vary the size of said first bowl outlet.

10. The centrifugal apparatus claimed in claim 1 wherein said collector means is in the form of a shroud disposed about the bowl assembly.

11. The centrifugal apparatus claimed in claim 10 wherein said second bowl outlet is defined by an annular barrier plate partially closing the bowl assembly.

*12. A centrifugal apparatus for separating particles from a slurry by flotation, said apparatus comprising,*

*a base,*

*impeller means for dispersing a slurry about an impeller axis,*

*a bowl assembly about said impeller means and into which the slurry is discharged by the impeller means, the bowl assembly including a first bowl outlet and a second bowl outlet offset from said first outlet,*

*drive means for said bowl assembly,*

*gaseous bubble generating means for discharging gaseous bubble streams and merging the discharged gaseous bubble streams into the slurry dispersed by the impeller means,*

*conduit means in communication with a source of gas for providing a gaseous flow to the gaseous bubble generating means, and*

*collector means disposed about said bowl assembly and defining chambers for separately collecting material from the first and second outlets.*

*13. The apparatus claimed in claim 12 wherein said impeller means is coupled to and driven by said bowl assembly.*

*14. The apparatus claimed in claim 12, further comprising:*

*separate drive means for said impeller means.*

*15. The apparatus claimed in claim 12 wherein said bubble generating means is circumferentially arranged about the bowl assembly.*

*16. The apparatus claimed in claim 12 wherein said bubble generating means includes porous aerators in said bowl assembly.*

*17. The apparatus claimed in claim 12 wherein said aerators are in a circular array.*

*18. The apparatus claimed in claim 12 wherein said bowl assembly has outwardly convergent surfaces terminating at said first outlet.*

*19. The apparatus claimed in claim 18 wherein said bowl assembly has an annular barrier, said second outlet embodied in a barrier rim past which slurry froth moves.*

*20. The apparatus claimed in claim 18 wherein said outwardly convergent surfaces terminate in opposed flanges,*

*spacers interposed between said flanges, and*

*means removably securing said spacers in place to permit spacer replacement to vary the size of said first bowl outlet.*

*21. The centrifugal apparatus claimed in claim 12 wherein said collector means is in the form of a shroud disposed about the bowl assembly.*

*22. The centrifugal apparatus claimed in claim 12 wherein said second bowl outlet is defined by an annular barrier plate partially closing the bowl assembly.*

*23. A method for separating particles from a slurry by flotation comprising the following steps:*

*dispersing a slurry about an impeller axis,*

*discharging gaseous bubble streams about the impeller axis and merging the discharged gaseous bubble streams into the dispersed slurry,*

*rotating the slurry containing the gaseous bubble streams about the impeller axis to subject it to centrifugal force, and*

*separating the resulting froth from the remainder of the slurry.*

*24. The method claimed in claim 23, including the following additional step:*

*angularly deflecting the dispersed slurry as the gaseous bubble streams are merged into the slurry.*

* * * * *